United States Patent [19]

Dohi et al.

[11] 4,235,654
[45] Nov. 25, 1980

[54] METHOD FOR PRODUCING COMPOSITE OPTICAL ELEMENTS OF GLASS AND POLYMER MATERIAL

[75] Inventors: Toshihide Dohi, Osaka; Sigeo Kitaguchi, Sakai, both of Japan

[73] Assignee: Minolta Camera Kabushiki Kaisha, Osaka, Japan

[21] Appl. No.: 912,744

[22] Filed: Jun. 5, 1978

[30] Foreign Application Priority Data

Jun. 16, 1977 [JP] Japan .................................. 52-71906

[51] Int. Cl.² ...................... B32B 17/10; C03C 17/30; G02C 7/02
[52] U.S. Cl. ..................................... 156/99; 65/60 B; 156/102; 156/245; 156/289; 264/1; 264/2; 264/219; 264/220; 350/311; 350/320
[58] Field of Search ................. 156/99, 245, 246, 289, 156/102; 264/1, 2, 299, 300, 219, 220; 350/311, 320; 351/166; 65/60 B; 427/165, 168, 169

[56] References Cited

U.S. PATENT DOCUMENTS

| | | | |
|---|---|---|---|
| 3,177,170 | 4/1965 | Lund | 65/60 B |
| 3,334,008 | 8/1967 | Park et al. | 156/99 |
| 3,873,352 | 3/1975 | Kitaj | 65/60 B |
| 4,068,260 | 1/1978 | Ohveda et al. | 350/166 |

FOREIGN PATENT DOCUMENTS 2636560 2/1978 Fed. Rep. of Germany ............. 156/99

*Primary Examiner*—Caleb Weston
*Attorney, Agent, or Firm*—Jackson, Jones & Price

[57] ABSTRACT

A method of producing a composite optical element such as lenses and optical filters is provided. The resulting product has a high quality precision surface with a relatively low production cost. A glass substrate is treated with a silanating agent to activate its surface. An organic polymer material can then be applied to the activated surface with a mold platen forming a desired exterior configuration. The organic polymer is then polymerized to form a relatively thin layer of cured organic material having the exterior desired surface configuration of the glass substrate. The composite optical product is then released from the mold in its final configuration in a relatively short time period.

16 Claims, 5 Drawing Figures

METHOD FOR PRODUCING COMPOSITE OPTICAL ELEMENTS OF GLASS AND POLYMER MATERIAL

BACKGROUND OF THE INVENTION

1. Field of the Invention

The present invention is directed to a method of producing composite optical elements and more particularly to a high speed production method in producing composite elements that can be cured and released from a mold in a short period of time.

2. Description of Background

This invention relates to a method for producing composite optical elements comprised of glass and an organic polymer material. Heretofore, many optical elements such as filters and lenses have been made solely of glass materials. This is because glass is available in a number of different types, glass products can be provided with different refraction powers, high precision can be achieved with glass in the finishing of planar and spherical surfaces and, except for its brittleness, glass is highly durable, to mention but a few reasons. Notwithstanding the broad utility of glass materials, the necessary finishing of such materials is still performed by grinding and polishing and this generally requires a long process time and, hence, high costs of production.

Under these circumstances, optical elements of clear organic polymer materials (plastics) have recently come into common use. With organic polymer materials, the grinding and polishing operations may be omitted and, if suitable processing techniques be selected, those materials lend themselves well to high production. However, up to the present time, only a few types of organic polymer materials have been found to be fully serviceable as optical elements and, with these materials, it has been difficult to obtain the desired refraction powers. Organic polymers are inferior to glass in physical and chemical properties, and especially because their thermal dimensional expansions and thermal changes in refraction powers are considerable, these materials have the disadvantage that, during processing, internal strains and sink-marks are often produced.

To compensate for the above disadvantages of both glass and organic high polymer materials, composite optical elements comprised of a combination of glass and a high polymer have recently been proposed. Such a composite optical element consists of a substrate of glass and a thin layer of a high polymer formed on the substrate. While this product still requires some polishing of the glass substrate surface to close tolerances, the formation of a thin layer of organic high polymer material on the substrate enables one to obtain an optical element of the final desired shape and permits a considerable simplification of the finishing operation. Since the organic polymer segment of the composite optical element is in the shape of a thin layer, the thermal expansion and the thermal change in refraction power are small, and hence, strains and sink-marks are less liable to be present in the final product.

For the production of such a composite optical element, particularly an optical spherical surface, Japanese Patent Laid-Open Publication No. 52/25651 of Feb. 25, 1977 proposed a method in which a photopolymerizable adhesive composition is used as the organic high polymer material. While this method is advantageous in that the polymerization of the photopolymerizable adhesive composition is completed in a short time, this advantage is offset by the disadvantage, that in order to prevent adhesion of the composition to the mold, it requires a complicated sequence of steps, namely the step of applying a mold release agent such as silver to the mold surface by vapor deposition, the step of releasing the composition from the mold and, the step of dissolving the mold release agent to leave the desired optical spherical surface. In other words, the short time for polymerization does not necessarily result in a short overall processing time.

SUMMARY OF THE INVENTION

It is an object of this invention to provide a method for producing composite optical elements wherein such optical elements are produced by a far less complicated procedure, in a shorter time and at reduced cost than the prior art.

This object is accomplished by the present invention which comprises the steps of treating a glass substrate with a silanating agent to activate the substrate with respect to an organic compound, laminating the activated glass substrate with a mold having a desired configuration through the intermediary of a clear organic prepolymer and, then, bombarding the laminate with application of energy such as light, heat or radiation to cause the prepolymer to further polymerize and, thereby, to form a thin layer of the cured organic compound on the glass substrate.

Because, in the production method of this invention, the glass substrate as activated by the silanating agent adheres intimately to the organic high polymer, it is not necessary that the organic high polymer itself have an adhesive property. This means that both the vapor deposition of a mold release on the mold and the dissolution of the mold release after removing the product from the mold, which are indispensible in the other methods may now be omitted, so that a composite optical element may be produced by a simple procedure in a short time and at reduced cost.

The above and other objects as well as the advantages of the present invention will become more apparent from the detailed description which is given below with reference to the accompanying drawings.

BRIEF DESCRIPTION OF THE DRAWINGS

FIG. 1 shows a step of immersing a glass substrate in a solution of a silanating agent;

FIG. 2 shows a step of drying the same glass substrate;

FIG. 3 shows a step of casting an organic prepolymer;

FIG. 4 shows a step of superimposing the glass substrate on a mold and causing the prepolymer to further polymerize; and FIG. 5 shows a step of releasing the glass-polymer composite from the mold.

DETAILED DESCRIPTION OF THE PREFERRED EMBODIMENTS

The following description is provided to enable any person skilled in the optical production field to make and use the invention and it sets forth the best modes contemplated by the inventors of carrying out their invention. Various modifications, however, are readily apparent to those skilled in the art, since the generic principles of the present invention are defined herein specifically to provide a method of producing a composite optical element in a relatively economical manner.

This invention will hereinafter be described with reference to the accompanying drawings which show an embodiment of the invention as applied to the production of an optical low-pass filter of the phase grating type having parallel gratings. Reference being made to U.S. Pat. No. 4,068,260 to disclose examples of filters and their relative dimensions.

Figure 1:
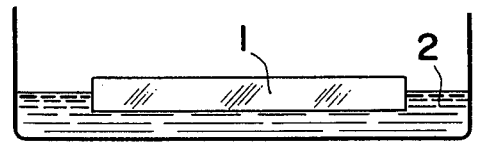
FIG. 1 through FIG. 5 show an embodiment of this invention as applied to the production of a low-pass filter of the phase grating type.

Referring to FIGS. 1 to 5, which illustrate a method for producing an optical low pass filter, a planar glass substrate which is appropriately cleaned, 1, is first immersed in a solution of a silanating agent such as a silane-coupling agent, FIG. 1. The solution may comprise a purely aqueous solution of the silanating agent having 1-5 percent of silanating agent. Alternatively mixtures of a relatively volatile organic solvent as ethyl alcohol and water may be used for effecting dissolution of the silanating agent. However the presence of water in the solution is required as it will become readily apparent from the further description of the preferred embodiments.

Figure 2:
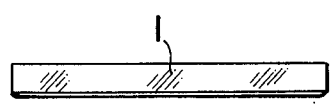
Figure 3:
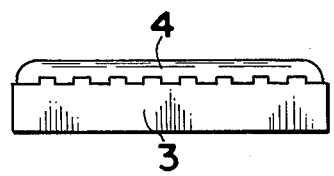
Figure 4:
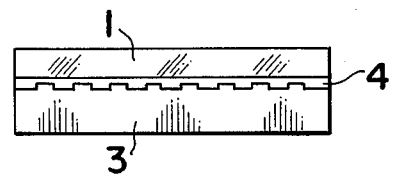
Figure 5:
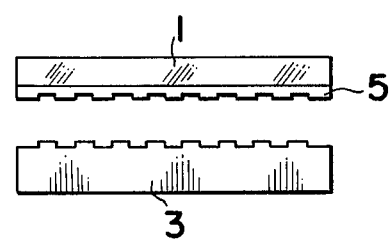

The glass substrate is then removed from the solution and dried, whereby a layer of the silanating agent remains deposited on the surface of the glass substrate, 1, FIG. 2. The manner of drying is not important as long as a thin layer of an active silanating agent remains on the glass substrate. Then, a predetermined amount of a clear prepolymer of organic polymerizable material, 4, is cast on a mold, 3, which has a patterened surface corresponding to the desired spacings of the rectangular phase grating of the optical low-pass filter to be manufactured, FIG. 3. The exact amount of prepolymer is subjectively determined depending on the volume of layer wanted for the filter. The aforementioned glass substrate, 1, is then superimposedly applied to the mold, FIG. 4. In doing this, the clearance between the mold, 3, and the glass substrate, 1, may be adjusted by spacer means such as a shim (not shown) of the proper thickness corresponding to the thickness of the desired organic polymer layer to be formed. Thereafter, the mold, 3, and the glass substrate, 1, superimposed thereon is as a unit placed in a curing chamber, in which the prepolymer, 4, is further polymerized by application of energy such as thermal energy, whereupon the polymer of the organic polymerizable material combines with the surface of the glass substrate, 1, to yield a thin layer on the substrate surface. Finally, the composite product of the glass substrate, 1, and the thin polymerized organic layer, 5, tightly adhrered thereto, is as a unit released from the mold, 3, as shown in FIG. 5. By the above procedure a commercial optical low-pass filter of the phase grating type is obtained at reduced cost.

As examples of the silanating agent, there may be mentioned vinyltrichlorosilane, vinyltriethoxysilane, vinyltris (β-methoxyethoxy) silane, γ-glycidoxypropyltrimethoxysilane, γ-methacryloxypropyltrimethoxysilane, N-β(aminoethyl)-γ-aminopropyltrimethoxysilane, N-β(aminoethyl) -γ-aminopropylmethyldimethoxysilane, γ-chloropropyltrimethoxysilane, γ-mercaptopropyltrimethoxysilane, γ-aminopropyltriethpxysilane, etc. Of course, other silane-coupling agents are also employable according to the specific properties of the organic compound to be combined to the glass substrate, 1. As a preferred example of the organic prepolymer, 4, a syrupy methyl methacrylate prepolymer with a conversion of 10 to 50 percent may be used, although prepolymers of other methacrylic acid esters, acrylic acid esters, sytrene, diethylene glycol bis(allyl carbonate), etc. as well as copolymers of such monomers can be employed.

These silanating agents contain hydrolyzable (e.g. alkoxy or halogeno) groups as well as organo-functional groups and, in the solution, 2, which contains water, the hydrolyzable groups undergo partial or complete hydrolysis to form silanol (SiOH) groups which condense with the Si-OH groups on the surface of the glass substrate, 1, to form covalent bonds. The term organo-functional groups is defined for the purposes of this application, as a functional group capable of surviving the hydrolytic condition employed in the immersion step when the silanating agent is dissolved in water, or in a mixture of an organic solvent and water, and capable of reacting with the functional groups present in the prepolymeric material, such as the functional groups comprising carbon-carbon double bonds. The surface of glass substrate, 1, is thus covered with the remaining organo-functional groups, whereby it is activated with respect to the organic compound and allowed to react therewith to produce intimate covalent bonding. By way of example, if the surface of a glass substrate, 1, is activated with γ-methacryloxypropyltrimethoxysilane, and a prepolymer of methyl methacrylate is polymerized in situ by means of thermal energy, the radicals (active groups) liberated from the methyl methacrylate react during the polymerization process with the methacryl groups derived from γ-methacryloxypropyltrimethoxysilane molecules, whereby a firm bond is established between the surface of glass substrate 1, and the polymethyl methacrylate. In contrast, no such bonding takes place between the mold, 3, and the polymerizable organic compound. Therefore, the glass substrate, 1, and the organic polymer layer, 5, can be easily removed as the composite unit from the mold, 3.

In view of the above description and example it is apparent that a silanating agent must possess the following properties in order to be suitable for application in this invention:

(1) it must contain functional groups which with or without preliminary hydrolysis are capable of forming covalent bonds with the glass surface;

(2) it must contain functional groups capable of reacting with the organic polymerizable material and forming covalent bonds therewith.

Thus in addition to the silanating agents specifically mentioned above, a suitable silanating agent can be appropriately selected for example from the following class of compounds having the generalized structural formula

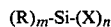

wherein n is an integer having the value of 1-3; each X independently is a halogen, or an alkoxy group having 1-6 carbons; m is an integer having the value of 1-3 so that the sum of $n+m=4$, and each R independently is an alkenyl group having 1-6 carbons, a halogeno alkyl, aminoalkyl, diaminoalkyl, and mercaptoalkyl group having 1-9 carbons and an alkenoyl, alkenoylalkyl, aminoalkanoyl, alkenoyloxy and alkenoyloxyalkyl group having 1-12 carbons.

In the above embodiment, the glass substrate, 1, is immersed in a solution of silanating agent, 2, for 2 to 3 seconds. Instead, a solution of the silanating agent may be applied by spraying or any other suitable coating procedure. With regards to the polymerization of the organic prepolymer, 4, in the curing chamber, the aforementioned syrupy methyl methacrylate prepolymer (conversion: 10-50%) can be completely polymerized and cured by heating at 60° C. for one hour and at 80° C. for a second hour.

To further assist in the release of the glassorganic polymer composite from the mold after the polymerization of the organic prepolymer has been completed, the temperature may be reduced gradually from 80° C. to 60° C. and then rapidly to 20°-25° C. in a time period of 5-10 seconds by water cooling. Alternatively, a mold release such a stearic acid may be previously incorporated into the organic prepolymer.

While, in the above embodiment, the organic prepolymer, 4, is cast on the mold, 3, similar results may be obtained by casting the prepolymer on a dry surface of glass substrate, 1, or between the glass substrate, 1, and mold, 3, as superimposed through appropriate spacer means.

Since the organic polymer layer, 5, of the resultant optical low-pass filter of the phase grating type has a thickness up to a few hundred microns, and has been firmly bonded to the surface of glass substrate, 1, via the silanating agent, the thermal expansion and any thermal change in refraction power are almost negligible. For example, a thermal stock test between $-20°$ C. and $+60°$ C. has shown that the polymer layer will not crack or peel, thus indicating that the composite optical element according to the present invention has a high resistance to temperature change.

Thus, because the organic polymer layer, 5, to be formed is relatively thin, the polymerization reaction may be completed within a comparatively short time as mentioned hereinbefore. Moreover, because the method of this invention does not require the step of applying a mold release directly to the mold, 3, or the step of dissolving the mold release after the formation of the organic polymer layer, a drastic overall reduction in processing time is accomplished. Moreover, because the organic polymer layer to be formed is thin, the progress of the polymerization reaction is substantially not dependent upon temperature. Therefore, the temperature within the curing chamber need not be critically controlled and, in this respect, the method of this invention contributes to reduced labor.

While the present invention has been described with reference to the production of a low-pass filter having parallel phase gratings, the present invention is also applicable to the production of color filters (with a dyestuff incorporated in the organic polymerizable composition), various phase-grating filters having delicate surface patterns, lenses having spherical or nonspherical surfaces, focussing screens, etc. Instead of bombardment of the composite element with thermal energy, the polymerization of the organic prepolymer may be accomplished by means of other electromagnetic radiation such as light and other rays of radiations. When the polymerization is effected with thermal energy, a polymerization initiator such as benzoyl peroxide or $\alpha,\alpha$-azobisisobutyronitrile may also be intimately mixed with the prepolymer. When ultraviolet radiation is utilized, benzoine may for instance be employed as the initiator.

The method of the present invention has been fully described to permit the practice of the invention by a person skilled in the field. Various modifications are possible within the teachings of this invention and according the scope of the invention should be determined solely from the following claims.

What is claimed is:

1. A method for mass producing a composite optical element by molding laminated optical elements comprised of a glass substrate and a thin outer layer of an organic polymer material in a mold having a cavity of a preselected configuration, the outer layer of the organic polymer material presenting a surface of a high tolerance replication of the mold cavity whereby the composite optical element is suitable for use in lens systems of photographic equipment and the like, the method comprising steps of:
    providing a mold cavity with a predetermined surface configuration of an optical element exterior surface;
    treating a glass substrate with a silanating agent to activate the substrate relative to a clear organic polymerizable material, the silanating agent having at least one functional group capable of forming covalent bonds with the glass substrate and also having at least one functional group capable of reacting with the organic polymerizable material, the organic polymerizable material being selected from a group consisting of prepolymers of metacrylic acid ester, acrylic acid ester, styrene and diethylene glycol bis (allylcarbonate);
    juxtaposing the activated substrate within the mold cavity having the desired configuration;
    disposing the organic polymerizable material between the activated substrate and the mold cavity surface thereby forming a laminate;
    curing the laminate with an application of an energy to the organic polymerizable material to further polymerize and, thereto to form the thin layer of the organic polymer material on the glass substrate, the thin layer of the organic polymer material being strongly attached to the glass substrate by covalent bonds; and
    releasing the thin layer of the organic polymer material on the glass substrate from the mold by application of force between the glass substrate and the mold to provide the composite optical element with a high tolerance optical quality surface.

2. A method as defined in claim 1, further comprising a step of incorporating a mold release in the organic polymerizable material.

3. A method as defined in claim 1, further comprising a step of reducing the temperature around the mold at a rapid rate for assisting the release of the layer of the organic polymer material from the mold.

4. A method as defined in claim 1, wherein the step of juxtaposition the activated substrate with the mold includes a step of interposing spacer means of a desired thickness between the activated substrate and the mold.

5. A method as defined in claim 1 wherein the step of juxtaposing includes steps of placing the mold at a predetermined distance from the activated glass substrate, and pouring the organic polymerizable material between the activated glass substrate and the mold.

6. A method as defined in claim 1 wherein the silanating agent is obtained from a precursor by hydrolysis prior to treating the glass substrate with the silanating agent, the precursor having the formula $(R)_m\text{-Si-}(X)_n$ wherein n is an integer having the value of 1–3; and each X independently is a halogen, or an alkoxy group having 1 to 6 carbons, m is an integer having the value of 1–3, the integers m and n satisfying the equation m+n=4; and each R independently is an alkenyl group having 1 to 6 carbons.

7. The method as defined in claim 1 wherein the silanating agent is obtained from a precursor by hydrolysis prior to treating the glass substrate with the silanating agent, the precursor having the general formula $(R)_m\text{-Si-}(X)_n$ wherein n is an integer having the value of 1–3, and each X independently is a halogen or an alkoxy group having 1–6 carbons; m is an integer having the value of 1–3, the integers m and n satisfying the equation m+n=4; each R independently is a halogenoalkyl, aminoalkyl, diaminoalkyl and mercaptoalkyl group having 1–9 carbons.

8. The method as defined in claim 1 wherein the silanating agent is obtained from a precursor by hydrolysis prior to treating the glass substrate with the silanating agent, the precursor having the formula $(R)_m\text{-Si-}(X)_n$ wherein n is an integer having the value of 1–3; each X independently is a halogen or an alkoxy group having 1–6 carbons; m is an integer having the value of 1–3, the integers m and n satisfying the equation m+n=4, each R independently is an alkenoyl, alkenoylalkyl, aminoalkanoyl, aminoalkanoylalkyl, alkenoyloxy, and alkenoyloxyalkyl group having 1–12 carbons.

9. A method as defined in claim 1, wherein said silanating agent is obtained by hydrolysis from a precursor selected from a group consisting of vinyltrichlorosilane, vinyltriethoxysilane, vinyltris (β-methoxyethoxy) silane, γ-glycidoxypropyltrimethoxysilane, γ-methacryloxypropyltrimethoxysilane, N-β(aminoethyl)-γ-aminopropyltrimethoxysilane, N-β(aminoethyl)-γ-aminopropylmethyldimethoxysilane, γ-chloropropyltrimethoxysilane, γ-mercaptropropyltrimethoxysilane, and γ-aminopropyltriethoxysilane.

10. A method as defined in claim 1 wherein the step of juxtaposing includes steps of putting the organic polymerizable material on the activated glass substrate, and putting the mold on the organic polymerizable material.

11. A method for producing a composite optical element suitable for use in optical lens systems, the element comprising a glass substrate and a surface of an organic polymer material having excellent conformance to a predetermined configuration of a precision mold, the method comprising the steps of:

treating a glass substrate with a silanating agent, the silanating agent having at least one functional group of a first kind capable of forming a covalent bond with the glass substrate, and also having a functional group of a second kind which is capable of forming a covalent bond with a prepolymer of the organic polymer material, the silanating agent and the prepolymer of the organic polymer material being specially selected for reactivity relative to one another;

disposing the prepolymer of the organic polymer material in contact with the glass substrate having the silanating agent thereon, and also in contact with the mold of the predetermined desired configuration;

curing the prepolymer by application of energy to provide the organic polymer material which is covalently bonded to the glass substrate through the silanating agent, and applying a force sufficient to release the organic polymer material from the mold.

12. The method of claim 11 wherein the prepolymer of the organic polymer material is selected from a group consisting of prepolymers of metacrylic acid ester, acrylic acid ester, styrene, and diethylene glycol bis(allyl carbonate) or is selected by combining any two from the same group.

13. The method of claim 12 wherein the silanating agent is obtained by hydrolysis of a precursor, the precursor being selected from a group consisting of vinyltrichlorosilane, vinyltriethoxysilane, vinyltris(β-methoxyethoxy)silane, γ-glycidoxypropyltrimethoxysilane, γ-methacryloxypropyltrimethoxysilane, N-β(aminoethyl)-γ-aminopropyltrimethoxysilane, N-β(aminoethyl)-γ-aminopropylmethyldimethoxysilane, γ-chloropropyltrimethoxysilane, γ-mercaptopropyltrimethoxysilane, and γ-aminopropyltriethoxysilane.

14. The method of claim 13 wherein the prepolymer of the organic polymerizable material is a prepolymer of methacrylic acid methyl ester and the silanating agent is obtained from γ-methacryloxypropyltrimethoxysilane.

15. The method of claim 14 wherein the step of curing comprises bombardment with ultraviolet rays.

16. The method of claim 15 wherein the composite optical element produced by the method is an optical low-pass filter.

* * * * *

UNITED STATES PATENT AND TRADEMARK OFFICE
CERTIFICATE OF CORRECTION

PATENT NO. : 4,235,654
DATED : November 25, 1980
INVENTOR(S) : Toshihide Dohi, Sigeo Kitaguchi It is certified that error appears in the above—identified patent and that said Letters Patent is hereby corrected as shown below:

Column 3, line 65, delete "γ-aminopropyltriethpxysilane" and insert --γ-aminopropyltriethoxysilane--

Column 6, Claim 4, line 57, delete "juxtaposition" and insert --juxtaposing--.

Signed and Sealed this

Twenty-first Day of April 1981

[SEAL]

Attest:

RENE D. TEGTMEYER

Attesting Officer

Acting Commissioner of Patents and Trademarks